United States Patent
Bergh et al.

(10) Patent No.: US 11,051,449 B2
(45) Date of Patent: Jul. 6, 2021

(54) LAWNMOWER CUTTING DECK WITH ANGLED CUTTER SHAFTS

(71) Applicant: HUSQVARNA AB, Huskvarna (SE)

(72) Inventors: Rickard Bergh, Eksjö (SE); Willy Olofsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/043,261

(22) PCT Filed: Mar. 13, 2019

(86) PCT No.: PCT/EP2019/056200
§ 371 (c)(1),
(2) Date: Sep. 29, 2020

(87) PCT Pub. No.: WO2019/185348
PCT Pub. Date: Oct. 3, 2019

(65) Prior Publication Data
US 2021/0015036 A1   Jan. 21, 2021

(30) Foreign Application Priority Data

Mar. 29, 2018 (SE) .................................. 1850357-3

(51) Int. Cl.
*A01D 34/44* (2006.01)
*A01D 34/535* (2006.01)
(Continued)

(52) U.S. Cl.
CPC ........... *A01D 34/44* (2013.01); *A01D 34/435* (2013.01); *A01D 34/535* (2013.01); *A01D 2101/00* (2013.01)

(58) Field of Classification Search
CPC ...... A01D 34/44; A01D 34/535; A01D 34/00; A01D 34/015; A01D 34/42; A01D 34/43;
(Continued)

(56) References Cited

U.S. PATENT DOCUMENTS 2,638,729 A * 5/1953 Bourg .................... A01D 42/08
 56/249
2,886,117 A * 5/1959 Benson ................ A01B 33/144
 172/545
(Continued)

FOREIGN PATENT DOCUMENTS

DE   3803725 A1   8/1989
EP    328080 A2   8/1989
(Continued)

OTHER PUBLICATIONS

International Search Report and Written Opinion from related international application No. PCT/EP2019/056200 dated Jun. 25, 2019, all pages cited in its entirety.
(Continued)

*Primary Examiner* — Adam J Behrens
(74) *Attorney, Agent, or Firm* — Burr & Forman, LLP

(57) ABSTRACT

A lawnmower cutting deck (1) is disclosed, wherein the cutting deck (1) is configured to be moved in a forward direction (d1) over a ground surface (5) to cut grass. The cutting deck (1) comprises at least a first cutter shaft (7.1) and at least one cutting unit (9) arranged on the first cutter shaft (7.1). The first cutter shaft (7.1) is configured to rotate around a first rotational axis (ax1) extending substantially parallel to the ground surface (5) to rotate the at least one cutting unit (9) in a first rotational plane (p1). The first rotational plane (p1) is angled in relation to the forward direction (d1). The present disclosure further relates to a lawnmower (3, 3') comprising a lawnmower cutting deck (1) and a method (100) of mowing a lawn.

23 Claims, 6 Drawing Sheets

(51) Int. Cl.
*A01D 34/43* (2006.01)
*A01D 101/00* (2006.01)

(58) Field of Classification Search
CPC . A01D 34/435; A01D 2101/00; A01D 34/008
See application file for complete search history.

(56) References Cited

U.S. PATENT DOCUMENTS

| | | | | |
|---|---|---|---|---|
| 3,035,393 | A * | 5/1962 | Mathews | A01D 34/435 56/505 |
| 3,087,294 | A * | 4/1963 | Kessler | A01D 34/435 56/13.6 |
| 3,176,454 | A | 4/1965 | Jepson et al. | |
| 3,811,255 | A * | 5/1974 | Ferguson | A01D 34/42 56/13.3 |
| 3,818,684 | A * | 6/1974 | Ferguson | A01D 34/42 56/13.3 |
| 3,894,385 | A | 7/1975 | Brown, Jr. | |
| 4,172,350 | A | 10/1979 | Vejux | |
| 4,848,068 | A * | 7/1989 | Staffanson | A01D 34/435 56/12.7 |
| 5,027,592 | A | 7/1991 | Weineke | |
| 5,220,773 | A | 6/1993 | Klaeger | |
| 5,822,965 | A | 10/1998 | Chesack et al. | |
| 7,278,597 | B2 * | 10/2007 | Fenton | A01D 34/435 241/194 |
| 2006/0230733 | A1 * | 10/2006 | Fenton | A01D 34/535 56/12.7 |
| 2007/0107401 | A1 * | 5/2007 | Jafarifar | A01D 34/68 56/12.7 |
| 2014/0230394 | A1 | 8/2014 | Zerbarini | |

FOREIGN PATENT DOCUMENTS

| | | |
|---|---|---|
| FR | 1387548 A | 1/1965 |
| WO | 9955138 A1 | 11/1999 |

OTHER PUBLICATIONS

Swedish Office Action and Search Report for Swedish Application No. 1850357-3, dated Nov. 8, 2018.
International Search Report and Written Opinion for International Application No. PCT/EP2019/056200 dated Jun. 25, 2019.

* cited by examiner

LAWNMOWER CUTTING DECK WITH ANGLED CUTTER SHAFTS

TECHNICAL FIELD

The present disclosure relates to a lawnmower cutting deck configured to be moved over a ground surface to cut grass. The present disclosure further relates to a lawnmower as well as a method of mowing a lawn.

BACKGROUND

Various types of lawnmowers exist on today's market. Examples are walk-behind mowers, riding mowers, and self-propelled robotic lawnmowers. A walk-behind mower is a lawnmower usually comprising an elongated handle allowing a user to push, and/or to guide, the lawnmower. Some walk-behind mowers comprise a propulsion arrangement configured to drive one or more wheels of the lawnmower. Walk-behind mowers lacking a propulsion arrangement are sometimes referred to as "push mowers". A riding mower is a mower comprising a seat for a user, a steering device, such as a steering wheel, and a motor configured to provide motive power to the riding mower. Usually, riding mowers are used to mow bigger lawns, gardens, parks, sports fields, golf courts or the like.

A self-propelled robotic lawnmower is a mower capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. In addition to the wire, robotic lawnmowers may also comprise other types of positioning units and sensors, for example sensors for detecting an event, such as a collision with an object within the area. The robotic lawnmower may move in a systematic and/or random pattern to ensure that the area is completely cut. In some cases, the robotic lawnmower uses the wire to locate a recharging dock used to recharge the one or more batteries. Generally, robotic lawnmowers operate unattended within the area in which they operate. Examples of such areas are lawns, gardens, parks, sports fields, golf courts and the like.

The above-mentioned types of lawnmowers use a cutting deck to cut grass. Traditionally, a cutting deck comprises a cutting device in the form of an elongated cutting arm which is rotated horizontally over a ground surface. As cutting portions of the elongates cutting arm hits vegetation, the vegetation is being cut.

Some lawnmowers comprise an electric motor configured to rotate the cutting device and some lawnmowers comprise a combustion engine configured to rotate the cutting device.

The use of an electric motor provides several advantages over the use of a combustion engine when it comes to emission levels, noise levels, operational reliability, and the need for service and repair. However, a problem associated with electrically powered lawnmowers is available operational time. That is, in riding mowers and self-propelled robotic lawnmowers it is usually not practically possible to use a power cord to power the electric motor. Therefore, these types of lawnmowers usually comprise one or more batteries configured to power the electric motor. When such one or more batteries are emptied, they must be recharged or replaced. One solution to prolong the available operational time could be to increase the size and/or the number of batteries. However, such a solution adds weight and costs to the lawnmower and in many cases, these is a practical limit for the size of the batteries of a lawnmower.

Available operational time is also a problem for lawnmowers comprising a combustion engine. This because such lawnmowers comprise a tank accommodating fuel, and when such a tank is emptied, it must be replenished.

Furthermore, various types of lawnmowers, such as those described above, are associated with some mutual problems. One such problem is cutting result, which can be subdivided into visual cutting result and uniformity of cutting. The visual cutting result can be defined as the visual cutting result determined by a person viewing a mowed lawn. The uniformity of the cutting can be defined as uniformity of a length of the grass of a mowed lawn, i.e. if straws of the grass in a lawn are cut to a uniform length.

SUMMARY

It is an object of the present invention to overcome, or at least alleviate, at least some of the above-mentioned problems and drawbacks.

According to a first aspect of the invention, the object is achieved by a lawnmower cutting deck, wherein the cutting deck is configured to be moved in a forward direction over a ground surface to cut grass. The cutting deck comprises at least a first cutter shaft and at least one cutting unit arranged on the first cutter shaft. The first cutter shaft is configured to rotate around a first rotational axis extending substantially parallel to the ground surface to rotate the at least one cutting unit in a first rotational plane. The first rotational plane is angled in relation to the forward direction.

Thereby, a cutting deck is provided capable of cutting grass in an energy efficient manner. This because the first cutter shaft is configured to rotate around the first rotational axis extending substantially parallel to the ground surface to rotate the at least one cutting unit in the first rotational plane. As a result thereof, when cutting portions of the at least one cutting unit hits vegetation, such as a grass straw, such a grass straw is being cut in a direction causing a more beneficial opposing force in the grass straw, via the root of the grass straw, as compared to when a cutting device rotating in a horizontal plane hits vegetation. Therefore, a cutting deck is provided capable of cutting grass in a manner causing a lower resistance torque in the cutter shaft. Accordingly, the cutting deck is capable of cutting grass using a low amount of energy.

As a further result thereof, a cutting deck is provided capable of increasing an available operational time of a lawnmower comprising the cutting deck. Furthermore, a more environmentally friendly cutting deck is provided.

Further, since the first rotational plane is angled in relation to the forward direction, the area covered by the at least one cutting unit, during movement of the cutting deck in the forward direction, is increased. Thereby, the efficiency of the cutting is improved, and the cutting result can be improved.

Still further, a cutting deck is provided capable of cutting clippings into small pieces, thus providing a mulched cutting result, while using a low amount of energy. In addition, a cutting deck is provided having conditions for distributing the clippings uniformly back into a lawn.

Accordingly, a lawnmower cutting deck is provided overcoming, or at least alleviating, at least some of the above-mentioned problems and drawbacks. As a result, the above-mentioned object is achieved.

Optionally, the first rotational plane is angled in relation to the forward direction at a first angle, and wherein the first angle is within the range of 5 degrees to degrees 85, or within the range of 10 degrees to 60 degrees. Thereby, an efficient cutting is provided, while a proper cutting result is ensured, because the at least one cutting unit covers a significant area during movement of the cutting deck in the forward direction.

Optionally, the at least one cutting unit comprises a rotor and one or more cutting members arranged on the rotor at a distance from the first rotational axis. Thereby, an efficient cutting is provided.

Optionally, each cutting member is pivotably arranged on the rotor. Thereby, an efficient cutting is provided, while safety during operation of the cutting deck is improved. This because if a cutting member is hitting for example a limb of a user, the cutting member may pivot instead of causing injury to the limb. Still further, the operational reliability of the cutting deck is improved. This because if a cutting member is hitting a hard object, such as a stone, it may pivot instead of getting damaged.

Optionally, each cutting member is pivotably arranged about a respective pivot axis, and wherein each pivot axis is substantially perpendicular to the first rotational plane. Thereby, an efficient cutting is provided, while safety during operation of the cutting deck is further improved. This because if a cutting member is hitting for example a limb of a user, the cutting member may pivot in a plane parallel to the first rotational plane instead of causing injury to the limb. Still further, the operational reliability of the cutting deck is further improved. This because if a cutting member is hitting a hard object, such as a stone, it may pivot in a plane parallel to the first rotational plane instead of getting damaged.

Optionally, each cutting member comprises a cutting edge extending in a direction substantially parallel to the first rotational plane. Thereby, a low resistance in the first cutter shaft is provided upon rotation of the at least one cutting unit. As a result, an energy efficient cutting deck is provided. Further, a cutting deck is provided capable of cutting clippings into small pieces, thus providing a mulched cutting result, while using a low amount of energy.

Optionally, each cutting member comprises a cutting portion extending in the first rotational plane. Thereby, a low resistance in the first cutter shaft is provided upon rotation of the at least one cutting unit. As a result, an energy efficient cutting deck is provided. Further, a cutting deck is provided capable of cutting clippings into small pieces, thus providing a mulched cutting result, while using a low amount of energy.

Optionally, the rotor is disc-shaped. Thereby, a low resistance in the first cutter shaft is provided upon rotation of the at least one cutting unit. As a result, an energy efficient cutting deck is provided. In addition, the safety during operation of the cutting deck is further improved. This because if the rotor is hitting for example a limb of a user, the rotor is less likely to cause injury to the limb than would be the case if the rotor had another type of shape. Further, the operational reliability of the cutting deck is further improved. This because if the rotor is hitting a hard object, such as a stone, the rotor is less likely to become damaged than if the rotor had another type of shape.

Optionally, the cutting deck is arranged such that a kinetic energy of each cutting member is below 90 Joules, or is below 2 Joules, during operation of the cutting deck. Thereby, an efficient cutting is provided, while safety during operation of the cutting deck is further ensured.

Optionally, the at least one cutting unit comprises a lower portion between the first rotational axis and the ground surface, and an upper portion above the first rotational axis, and wherein the cutting deck comprises a cover covering the upper portion of the at least one cutting unit. Thereby, a safer cutting deck is provided. In addition, the visual cutting result can be improved because the cover may guide grass being cut along an inner surface thereof. As a further result, a cutting deck is provided having conditions for further efficient distribution of clippings back into a lawn.

Optionally, the cutting deck comprises at least one guiding member arranged adjacent to the first rotational plane, and wherein the at least one guiding member is configured to guide grass towards the first rotational plane during operation of the cutting deck. Thereby, a further efficient cutting is provided, because the guiding member is configured to guide grass towards the first rotational plane in which the at least one cutting unit is rotating.

Optionally, radially outer portions of the at least one cutting unit follow a circular path upon rotation of the at least one cutting unit, and wherein the guiding member extends in a direction substantially parallel to the first rotational plane to a position adjacent to a lower tangent of the circular path. Thereby, a further efficient cutting is provided, because the guiding member will guide grass towards the first rotational plane in which the at least one cutting unit is rotating. Still further, the operational reliability of the cutting deck is further improved. This because during operation of the cutting deck, the guiding member may bump into an object on the ground surface, such as a stone or stump, instead of the cutting unit. Thereby, the at least one cutting unit can be protected from becoming damaged.

Optionally, the first cutter shaft is configured to rotate in a rotational direction causing a portion of the at least one cutting unit below the first rotational axis to move in a tangential direction having a component in the forward direction. Thereby, a further efficient cutting is provided. This because when cutting portions of the at least one cutting unit hits vegetation, such as a grass straw, such a grass straw is being cut in a forward/upward motion causing a further beneficial opposing force in the grass straw, via the root of the grass straw. Further, the visual cutting result can be improved because grass being cut by the cutting unit may be thrown around the first rotational axis and may be thrown off the cutting unit at a location behind the cutting unit, seen in the forward direction. Thus, cutting deck is provided having conditions for further efficient distribution of clippings back into a law.

Optionally, the cutting deck comprises two or more cutting units arranged at an axial distance from each other along the first cutter shaft. Thereby, the efficiency of the cutting is improved because the two or more cutting units together cover a great area when the cutting deck is moved in the forward direction.

Optionally, the cutting deck comprises a second cutter shaft and at least one cutting unit arranged on the second cutter shaft, wherein the second cutter shaft is configured to rotate around a second rotational axis extending substantially parallel to the ground surface to rotate the at least one cutting unit in a second rotational plane, and wherein the second rotational plane is angled in relation to the forward direction. Thereby, the efficiency of the cutting is improved because the cutting units of the first and second cutter shafts together cover a great area during movement of the cutting deck in the forward direction. As a further result thereof, the cutting result is improved.

Optionally, the second rotational plane is angled in relation to the forward direction at a second angle, and wherein the second angle is within the range of 5 degrees to degrees 85, or within the range of 10 degrees to 60 degrees. Thereby, an efficient cutting is provided, while a proper cutting result is ensured, because the at least one cutting unit of the second cutter shaft covers a significant area during movement of the cutting deck in the forward direction.

Optionally, the second angle is different from the first angle. Thereby, the cutting result and the efficiency of cutting can be further improved because cutting units of the second cutter shaft will have a different cutting angle than cutting units of the first cutter shaft.

Optionally, one of the first and second rotational planes is angled clockwise in relation to the forward direction seen in a direction towards the ground surface, and the other of the first and second rotational planes, is angled counter clockwise in relation to the forward direction seen in the direction towards the ground surface. Thereby, the cutting result and the efficiency of cutting can be further improved.

Optionally, the second cutter shaft is arranged behind the first cutter shaft seen in the forward direction. Thereby, the cutting result is further improved. This because cutting units of the second shaft may cut grass that has not been cut by cutting units of the first shaft.

Optionally, the cutting deck comprises two or more cutting units arranged on the first cutter shaft and two or more cutting units arranged on the second cutter shaft. Thereby, the cutting result and the efficiency of cutting is further improved. This because cutting units of the first and second cutter shaft together cover a great area when the cutting deck is moved in the forward direction and cutting units of the second cutter shaft may cut grass that has not been cut by cutting units of the first cutter shaft.

Optionally, cutting units of the second cutter shaft are displaced in a direction perpendicular to the forward direction in relation to cutting units of the first cutter shaft approximately half the distance between cutting units of the first cutter shaft measured in the direction perpendicular to the forward direction. Thereby, the cutting result and the efficiency of cutting is further improved. This because cutting units of the first and second cutter shaft together cover a great area when the cutting deck is moved in the forward direction and cutting units of the second cutter shaft may cut grass that has not been cut by cutting units of the first cutter shaft. As a result, the visual cutting result as well as the uniformity of cutting is improved.

Optionally, the cutting deck comprises a third cutter shaft and at least one cutting unit arranged on the third cutter shaft, wherein the third cutter shaft is configured to rotate around a third rotational axis extending substantially parallel to the ground surface to rotate the at least one cutting unit in a third rotational plane, and wherein the third rotational plane is angled in relation to the forward direction. Thereby, the efficiency of the cutting is improved because the cutting unit of the first and third cutter shafts together cover a great area during movement of the cutting deck in the forward direction. As a further result thereof, the cutting result is improved.

Optionally, the third rotational plane is angled in relation to the forward direction at a third angle, and wherein the third angle is within the range of 5 degrees to degrees 85, or within the range of 10 degrees to 60 degrees. Thereby, an efficient cutting is provided, while a proper cutting result is ensured, because the at least one cutting unit of the third cutter shaft covers a significant area during movement of the cutting deck in the forward direction.

Optionally, the third angle is different from the first angle. Thereby, the cutting result and the efficiency of cutting can be further improved because cutting units of the third cutter shaft will have a different cutting angle than cutting units of the first cutter shaft.

Optionally, one of the first and third rotational planes is angled clockwise in relation to the forward direction seen in a direction towards the ground surface, and the other of the first and third rotational planes, is angled counter clockwise in relation to the forward direction seen in the direction towards the ground surface. Thereby, the cutting result and the efficiency of cutting can be further improved.

Optionally, the third cutter shaft is laterally displaced relative the first cutter shaft seen in the forward direction. Thereby, the efficiency of cutting is further improved because cutting units of the first and third cutter shafts together cover a great area upon movement of the cutting deck in the forward direction.

Optionally, the third rotational plane is substantially parallel to the second rotational plane. Thereby, the cutting result is improved because cutting units of the third and second cutter shafts will cut grass in a substantially uniform manner.

Optionally, the cutting deck comprises two or more cutting units arranged on the first cutter shaft and two or more cutting units arranged on the third cutter shaft, and wherein a distance between a point in which the third rotational axis intersects a third rotational plane of a cutting unit of the third cutter shaft and a point in which the first rotational axis intersects a first rotational plane of a cutting unit of the first cutter shaft measured in a direction perpendicular to the forward direction, substantially corresponds to a distance between first rotational planes of cutting units of the first cutter shaft measured in the direction perpendicular to the forward direction. Thereby, the cutting result is further improved because the cutting units are arranged at a substantial equal distance from each other, measured in the direction perpendicular to the forward direction.

Optionally, the cutting deck comprises a fourth cutter shaft and at least one cutting unit arranged on the fourth cutter shaft, wherein the fourth cutter shaft is configured to rotate around a fourth rotational axis extending substantially parallel to the ground surface to rotate the at least one cutting unit in a fourth rotational plane, and wherein the fourth rotational plane is angled in relation to the forward direction. Thereby, the efficiency of the cutting is improved because the cutting unit of the first and fourth cutter shafts together cover a great area during movement of the cutting deck in the forward direction. As a further result thereof, the cutting result is improved.

Optionally, the fourth rotational plane is angled in relation to the forward direction at a fourth angle, and wherein the fourth angle is within the range of 5 degrees to degrees 85, or within the range of 10 degrees to 60 degrees. Thereby, an efficient cutting is provided, while a proper cutting result is ensured, because the at least one cutting unit of the fourth cutter shaft covers a significant area during movement of the cutting deck in the forward direction.

Optionally, the fourth angle is different from the third angle. Thereby, the cutting result and the efficiency of cutting can be further improved because cutting units of the fourth cutter shaft will have a different cutting angle than cutting units of the third cutter shaft.

Optionally, one of the third and fourth rotational planes is angled clockwise in relation to the forward direction seen in a direction towards the ground surface, and the other of the third and fourth rotational planes, is angled counter clockwise in relation to the forward direction seen in the direction towards the ground surface. Thereby, the cutting result and the efficiency of cutting can be further improved.

Optionally, the fourth cutter shaft is arranged behind the third cutter shaft seen in the forward direction. Thereby, the cutting result is further improved. This because cutting units of the fourth cutter shaft may cut grass which not is cut by cutting units of the third cutter shaft.

Optionally, the fourth rotational plane is substantially parallel to the first rotational plane. Thereby, the cutting result is improved because cutting units of the fourth and first cutter shafts will cut grass in a substantially uniform manner.

Optionally, the cutting deck comprises two or more cutting units arranged on the third cutter shaft and two or more cutting units arranged on the fourth cutter shaft. Thereby, the cutting result and the efficiency of cutting is further improved. This because cutting units of the third and fourth cutter shaft together cover a great area when the cutting deck is moved in the forward direction and cutting units of the fourth cutter shaft may cut grass which not is cut by cutting units of the first cutter shaft.

Optionally, cutting units of the fourth cutter shaft are displaced in a direction perpendicular to the forward direction in relation to cutting units of the third cutter shaft approximately half the distance between cutting units of the third cutter shaft measured in the direction perpendicular to the forward direction. Thereby, the cutting result and the efficiency of cutting is further improved. This because cutting units of the third and fourth cutter shaft together cover a great area when the cutting deck is moved in the forward direction and cutting units of the fourth cutter shaft may cut grass that has not been cut by cutting units of the third cutter shaft. As a result, the visual cutting result as well as the uniformity of cutting is improved.

Optionally, the cutting deck comprises two or more cutting units arranged on the second cutter shaft and two or more cutting units arranged on the fourth cutter shaft, and wherein a distance between a point in which the fourth rotational axis intersects a fourth rotational plane of a cutting unit of the fourth cutter shaft and a point in which the second rotational axis intersects a second rotational plane of a cutting unit of the second cutter shaft measured in a direction perpendicular to the forward direction, substantially corresponds to a distance between second rotational planes of cutting units of the second cutter shaft measured in the direction perpendicular to the forward direction. Thereby, the cutting result is further improved because cutting units are arranged at a substantial equal distance from each other, measured in the direction perpendicular to the forward direction.

Optionally, the first, the second, the third, and the fourth rotational axes, together form a rhomboid. Thereby, the cutting result and the efficiency of cutting is further improved.

Optionally, the number of cutting units arranged on each cutter shaft, of the cutting deck is within the range of three to twenty, or within the range of four to twelve. Thereby, the cutting result and the efficiency of cutting is further improved.

Optionally, the cutting deck comprises a housing covering upper portions of all cutting units of the cutting deck. Thereby, the safety is improved during operation of the cutting deck. This because the risk that an object, such as a limb of a user, is bumping into one or more cutting units is reduced.

According to a second aspect of the invention, the object is achieved by a lawnmower comprising a lawnmower cutting deck according to some embodiments.

Thereby, a lawnmower is provided capable of cutting grass in an energy efficient manner. This because the cutting deck of the lawnmower comprises at least a first cutter shaft configured to rotate around a first rotational axis extending substantially parallel to the ground surface to rotate at least one cutting unit in a first rotational plane. As a result thereof, when cutting portions of the at least one cutting unit hits vegetation, such as a grass straw, such a grass straw is being cut in a direction causing a more beneficial opposing force in the grass straw, via the root of the grass straw, as compared to when a cutting device rotating in a horizontal plane hits vegetation. Therefore, a lawnmower is provided capable of cutting grass in a manner causing a lower resistance torque in the cutter shaft. Accordingly, the lawnmower is capable of cutting grass using a low amount of energy.

As a further result thereof, a lawnmower is provided having conditions for a prolonged operational time. Further, a more environmentally friendly lawnmower can be provided.

Furthermore, since the first rotational plane is angled in relation to the forward direction, the area covered by the at least one cutting unit, during movement of the lawnmower in the forward direction, is increased. Thereby, the efficiency of the cutting is improved, and the cutting result can be improved.

Still further, a lawnmower is provided capable of cutting clippings into small pieces, thus providing a mulched cutting result, while using a low amount of energy. In addition, a lawnmower is provided having conditions for distributing the clippings uniformly back into a lawn.

Accordingly, a lawnmower is provided overcoming, or at least alleviating, at least some of the above-mentioned problems and drawbacks. As a result, the above-mentioned object is achieved.

Optionally, the lawnmower comprises an electric motor configured to rotate one or more cutter shafts of the lawnmower. Thereby, an environmentally friendly lawnmower is provided having conditions for generating low noise levels during operation and low emission levels during operation. Still further, a lawnmower is provided having conditions for an increased available operational time because the lawnmower comprises an energy efficient cutting deck.

Optionally, the lawnmower comprises one electric motor per cutter shaft, and wherein each electric motor is configured to rotate a respective cutter shaft. Thereby, an efficient, simple, and reliable rotation of cutter shafts is provided.

Optionally, the lawnmower is a self-propelled robotic lawnmower. Thereby, a self-propelled robotic lawnmower is provided having conditions for an increased available operational time because the self-propelled robotic lawnmower comprises an energy efficient cutting deck. Further, an environmentally friendly self-propelled robotic lawnmower can be provided having conditions for generating low noise levels during operation and low emission levels during operation. Still further, a self-propelled robotic lawnmower is provided capable of cutting clippings into small pieces, thus providing a mulched cutting result, while using a low amount of energy. In addition, a self-propelled robotic lawnmower is provided having conditions for distributing the clippings uniformly back into a lawn.

Optionally, the lawnmower is a riding mower comprising a seat for an operator. Thereby, a riding mower is provided having conditions for an increased available operational time because the riding mower comprises an energy efficient cutting deck. Further, an environmentally friendly riding mower can be provided having conditions for generating low noise levels during operation and low emission levels during operation. Still further, a riding mower is provided capable of cutting clippings into small pieces, thus providing a mulched cutting result, while using a low amount of energy. In addition, a riding mower is provided having conditions for distributing the clippings uniformly back into a lawn.

According to a third aspect of the invention, the object is achieved by a method of mowing a lawn, wherein the method comprises the steps of:

providing a lawnmower cutting deck comprising a first cutter shaft and at least one cutting unit arranged on the first cutter shaft, moving the lawnmower cutting deck in a forward direction over a ground surface, and rotating the first cutter shaft around a first rotational axis extending substantially parallel to the ground surface to rotate the at least one cutting unit in a first rotational plane, wherein the first rotational plane is angled in relation to the forward direction.

Thereby, an energy efficient method of mowing a lawn is provided. This because the method comprises rotating the first cutter shaft around a first rotational axis extending substantially parallel to the ground surface to rotate the at least one cutting unit in a first rotational plane. As a result thereof, when cutting portions of the at least one cutting unit hits vegetation, such as a grass straw, such a grass straw is being cut in a direction causing a more beneficial opposing force in the grass straw, via the root of the grass straw, as compared to when a cutting device rotating in a horizontal plane hits vegetation. Therefore, a method is provided capable of cutting grass in a manner causing a lower resistance torque in a cutter shaft. Accordingly, the method is capable of cutting grass using a low amount of energy.

As a further result thereof, a method of mowing a lawn is provided capable of increasing an available operational time of a lawnmower. Further, a more environmentally friendly method of mowing a lawn is provided.

Furthermore, since the first rotational plane is angled in relation to the forward direction, the area covered by the at least one cutting unit, during movement of the lawnmower in the forward direction, is increased. Thereby, the efficiency of the cutting is improved, and the cutting result can be improved.

Still further, a method is provided capable of cutting clippings into small pieces, thus providing a mulched cutting result, while using a low amount of energy. In addition, a method is provided having conditions for resulting in a uniform distribution of clippings back into a lawn.

Accordingly, a method is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
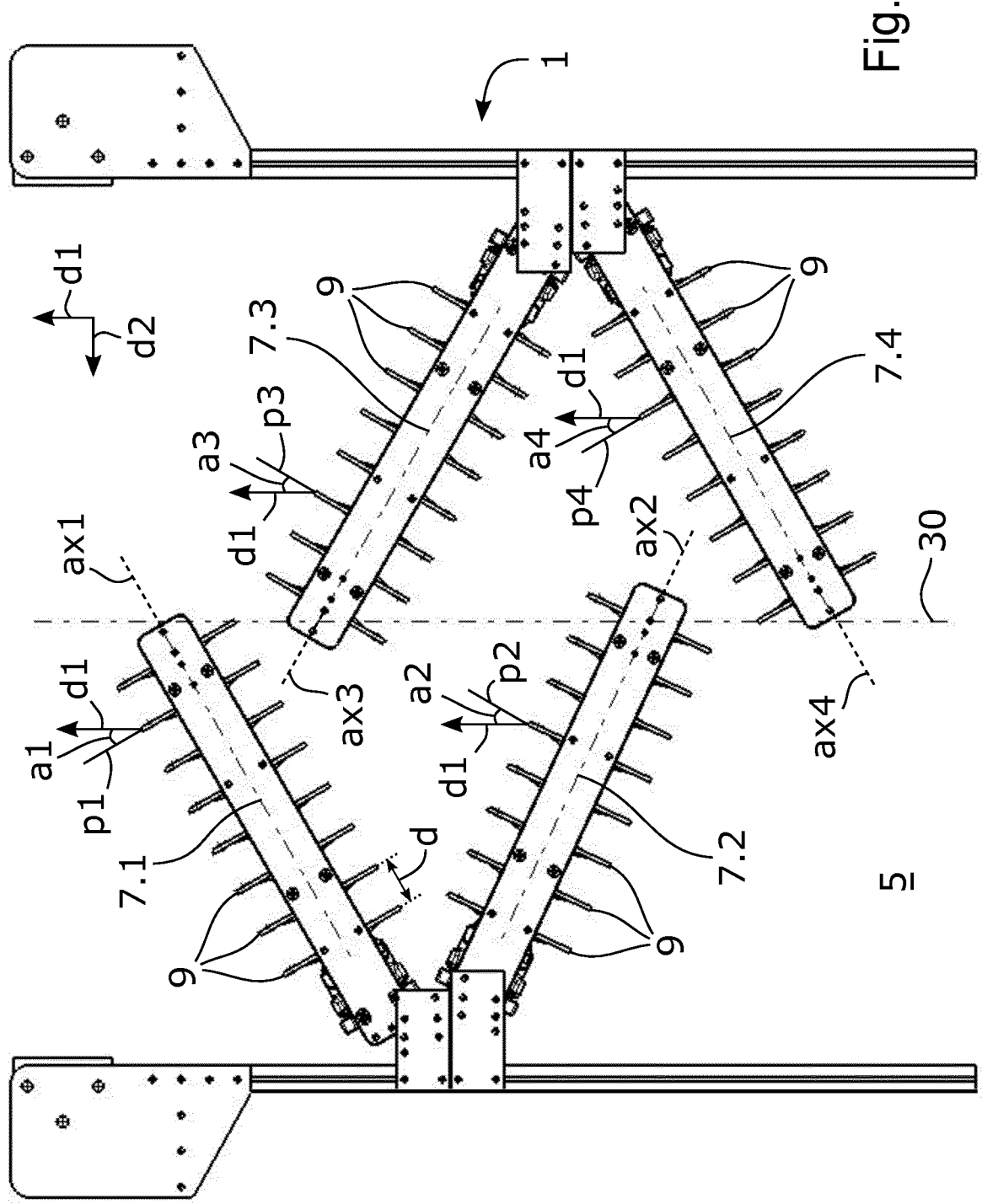
FIG. 1 illustrates a lawnmower cutting deck, according to some embodiments.

FIG. 1 illustrates a lawnmower cutting deck 1, according to some embodiments. For the reason of brevity, the lawnmower cutting deck 1 is in some places herein referred to as the cutting deck 1. In FIG. 1, the cutting deck 1 is illustrated as being viewed from above when the cutting deck 1 is positioned on a ground surface 5. The cutting deck 1 is configured to be moved in a forward direction d1 over a ground surface 5 to cut grass. The cutting deck 1 comprises at least a first cutter shaft 7.1 and at least one cutting unit 9 arranged on the first cutter shaft 7.1. According to the illustrated embodiments, the cutting deck 1 comprises four cutter shafts 7.1, 7.2, 7.3, 7.4 each comprising eight cutting units 9 arranged on the respective cutter shaft 7.1, 7.2, 7.3, 7.4. Herein, these cutter shafts 7.1, 7.2, 7.3, 7.4 are referred to as the first cutter shaft 7.1, the second cutter shaft 7.2, the third cutter shaft 7.3, and the fourth cutter shaft 7.4. However, as will be further explained herein the cutting deck 1 may comprise another number of cutter shafts 7.1, 7.2, 7.3, 7.4 which may each comprise another number of cutting units 9 than eight. However, for the reason of brevity, in the following section below, reference is made to the first cutter shaft 7.1 of the four cutter shafts 7.1, 7.2, 7.3, 7.4.

The first cutter shaft 7.1 is configured to rotate around a first rotational axis ax1. When the cutting deck 1 is positioned onto a ground surface 5, the first rotational axis ax1 extends substantially parallel to the ground surface 5. The feature that the first rotational axis ax1 extends substantially parallel to the ground surface 5 may encompass that an angle between the first rotational axis ax1 and the ground surface 5 is less than 5 degrees. The cutting units 9 of the first cutter shaft 7.1 are arranged on the first cutter shaft 7.1. When the first cutter shaft 7.1 is rotating around the first rotational axis ax1, each cutting unit 9 of the first cutter shaft 7.1 is rotating in a respective first rotational plane p1. For the reason of brevity, one such first rotational plane p1 is indicated with the reference sign "p1" in FIG. 1. The cutting units 9 of the first cutter shaft 7.1 are arranged at an axial distance d from each other along the first cutter shaft 7.1. Since the cutting units 9 are arranged on the first rotational axis ax1 and since the first cutter shaft 7.1 is arranged to rotate around the first rotational axis ax1 being substantially parallel to the ground surface 5, each first rotational plane p1 is substantially perpendicular to the ground surface 5. Further, as can be seen in FIG. 1, the first rotational plane p1 is angled in relation to the forward direction d1. Due to these features, a cutting deck 1 is provided capable of cutting grass in an efficient manner requiring a low amount of energy.

The first rotational plane p1 is angled in relation to the forward direction d1 at a first angle a1. According to the illustrated embodiments, the first angle a1 is approximately 30 degrees. According to further embodiments, the first angle a1 may be within the range of 5 degrees to 85 degrees, or within the range of 10 degrees to 60 degrees, or within the range of 20 degrees to 40 degrees.

According to the illustrated embodiments, the second cutter shaft 7.2 of the cutting deck 1 is arranged behind the first cutter shaft 7.1 seen in the forward direction d1.

Figure 2:
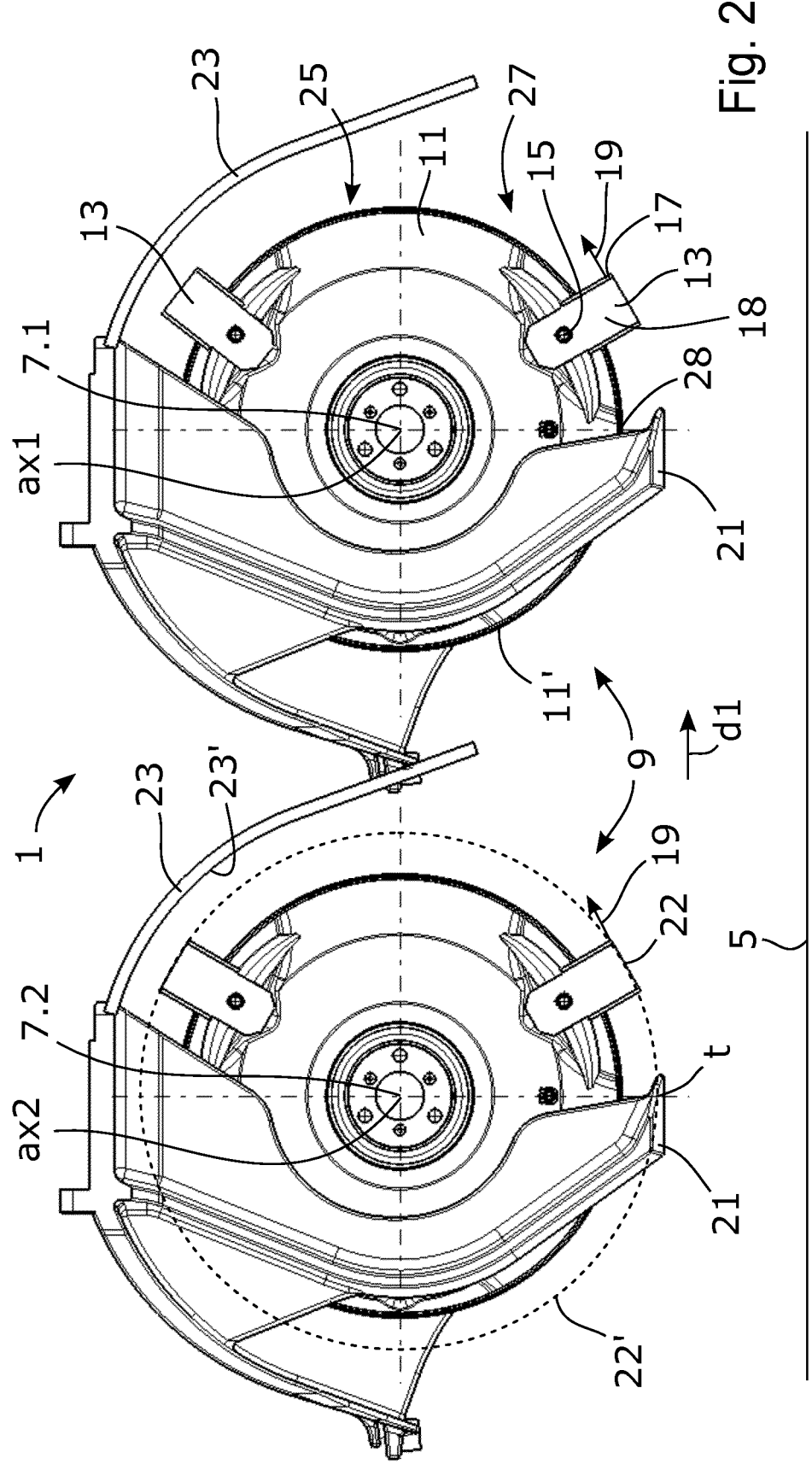
FIG. 2 illustrates a cross section of the lawnmower cutting deck illustrated in FIG. 1, FIG. 3 schematically illustrates a portion of the cutting unit of the first cutter shaft, illustrated in FIG. 2, FIG. 4 schematically illustrates a rotor and a cutting member of a cutting unit, according to some embodiments.

FIG. 2 illustrates a cross section of the lawnmower cutting deck 1 illustrated in FIG. 1. In the cross section of FIG. 2, the cutting deck 1 is illustrated as being viewed from the side, i.e. in a direction parallel to the ground surface 5 and perpendicular to the forward direction d1. In FIG. 2, one cutting unit 9 of the first cutter shaft 7.1 and one cutting unit 9 of the second cutter shaft 7.2 are visible. Below, some features and advantages are explained with reference to the cutting unit 9 of the first cutter shaft 7.1, and some features and advantages are explained with reference to the cutting unit 9 of the second cutter shaft 7.2. However, according to the illustrated embodiments, all cutter shafts 7.1, 7.2, 7.3, 7.4 of the cutting deck 1 comprises the same type of cutting units 9 comprising the same features and advantages. Accordingly, features and advantages explained herein with reference a cutting unit 9 of one cutter shaft 7.1, 7.2, 7.3, 7.4 are applicable to cutting units 9 of other cutter shaft 7.1, 7.2, 7.3, 7.4 of the cutting deck 1.

As indicated in FIG. 1, the cutting unit 9 comprises a rotor 11 and one or more cutting members 13 arranged on the rotor 11 at a distance from the first rotational axis ax1. According to the illustrated embodiments, three cutting members 13 are arranged each rotor 11. According to further embodiments, each rotor 11 may comprise another number of cutting members 13, such as one, two, four, five, or six. According to the illustrated embodiments, each cutting member 13 is attached to the rotor 11. According to some embodiments, each cutting member 13 may be removably attached to the rotor 11. Each cutting member 13 is pivotably arranged on the rotor 11 about a respective pivot axis 15. Each pivot axis 15 is substantially perpendicular to the rotational plane of the cutting unit 9. According to the illustrated embodiments, the rotor 11 is disc-shaped and each pivot axis 15 is arranged at a distance from a radially outer edge 11' of the disc-shaped rotor 11. The radially outer edge 11' of the disc-shaped rotor 11 is substantially circular. Each cutting member 13 is provided with a length being greater than the distance between the pivot axis 15 and the radially outer edge 11' of the disc-shaped rotor 11. Further, each cutting member 13 is configured to assume a radial position by centrifugal force acting on the cutting member 13 during rotation of the cutting unit 9, causing the cutting member 13 to extend past the radially outer edge 11' of the rotor 11.

Each cutting member 13 comprises a cutting edge 17 extending in a direction 19 substantially parallel to the rotational plane of the cutting unit 9. Further, each cutting member 13 comprises a cutting portion 18 extending in the rotational plane of the cutting unit 9. Due to these features, an energy efficient cutting can be performed because the cutting units 9 are subjected to a low amount of resistance during cutting, as well as a low amount of air resistance during rotation of the cutting unit 9. In addition, since the cutting members 13 are pivotably arranged on the rotor 11 about a respective pivot axis 15, the cutting members 13 may pivot in case cutting members 13 strikes a hard object, or a limb of a user. In this manner, the safety during operation of the cutting deck 1 is improved, as well as the operational reliability of the cutting deck 1.

According to the illustrated embodiments, the cutter shafts 7.1, 7.2 of the cutting deck 1 are each configured to rotate in a respective rotational direction causing a respective portion 28 of cutting units 9, below the rotational axis ax1, ax2 of the cutter shaft 7.1, 7.2 to move in a tangential direction having a component in the forward direction d1.

Figure 3:
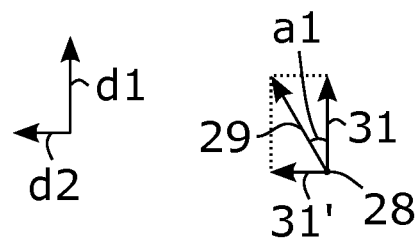

FIG. 3 schematically illustrates the portion 28 of the cutting unit 9 of the first cutter shaft 7.1, illustrated in FIG. 2. Further, in FIG. 3, the forward direction d1 is illustrated as well as a direction d2 perpendicular to the forward direction d1. As can be seen in FIG. 3, the portion 28 of the cutting unit will move in a tangential direction 29 having a component 31 in the forward direction d1 during rotation of the first cutter shaft. Since the first rotational plane of the cutting unit is angled in relation to the forward direction d1 at the angle a1, the portion 28 of the cutting unit will move in a tangential direction 29 having a component 31 in the forward direction d1, during rotation of the first cutter shaft, as well as a component 31' in the direction d2 perpendicular to the forward direction d1.

Below, reference is made to FIG. 2, as well as to FIG. 1. According to the illustrated embodiments, portions 28 of cutting units 9 below the respective rotational axis ax1, ax2, ax3, ax4 move in directions having components in the forward direction d1. As a result, an efficient cutting is achieved and a cutting deck 1 is provided capable of cutting clippings into small pieces, thus providing a mulched cutting result, while using a low amount of energy.

This because when the cutting deck 1 is moved in the forward direction 1, the cutting will be performed in a forward/upward motion by the cutting members 13, which is advantageous regarding the energy consumption as well as regarding the cutting result. One reason is that a more beneficial opposing force in a grass straw, via the root of the grass straw, is obtained because the cutting is performed in a forward/upward motion.

As indicated in FIG. 2, the cutting unit 9 of the first cutter shaft 7.1 comprises a lower portion 27 between the first rotational axis ax1 and the ground surface 5, and an upper portion 25 above the first rotational axis ax1, when the cutting deck 1 is positioned onto a ground surface 5 in an intended operational position. The cutting deck 1 comprises a cover 23 covering the upper portion 25 of the cutting unit 9. The cutting deck 1 may comprise one cover 23 per cutting unit 9, covering the upper portion 25 of the respective cutting unit 9. According to further embodiments, the cutting deck 1 may comprise one elongated cover per cutter shaft 7.1, 7.2, 7.3, 7.4 covering upper portions 25 of cutting units 9 of the respective cutter shaft 7.1, 7.2, 7.3, 7.4.

As indicated in FIG. 2, radially outer portions 22 of a cutting unit 9 follow a circular path 22' upon rotation of the cutting unit 9. According to illustrated embodiments, an inner surface 23' of the cover 23 substantially follows the circular path 22'. As a result thereof, during operation of the cutting deck 1, grass being cut by a cutting member 13 in the forward/upward motion as explained above, may follow the inner surface 23' of the cover 23, and may be thrown out of the cover 23 behind the cutting unit 9 seen in the forward direction d1. Thereby, the visual cutting result can be improved and the operational reliability of the cutting deck 1 can be further improved. In addition, a cutting deck 1 is provided having conditions for distributing the clippings uniformly back into a lawn. Furthermore, due to the covers 23, the safety during operation of the cutting deck 1 can be improved.

According to the illustrated embodiments, the cutting deck 1 comprises guiding members 21 arranged adjacent to rotational planes of cutting members 9. The guiding members 21 are configured to guide grass towards the rotational planes of the cutting members 9 during operation of the cutting deck 1. As mentioned above, radially outer portions 22 of cutting units 9 follow a circular path 22' upon rotation of the cutting units 9. According to the illustrated embodiments, the guiding members 21 extend in a direction substantially parallel to the rotational plane of the cutting unit 9 to a position adjacent to a lower tangent t of the circular path 22'. The lower tangent t is a point of the circular path 22' closest to the ground surface 5 when the cutting deck 1 is positioned onto a ground surface 5 in an intended operational position. Due to these features, a further efficient cutting is provided, because the guiding member 21 will guide grass towards the rotational plane in which the cutting unit 9 is rotating. In addition, the guiding members 21 may ensure that a distance is obtained between rotors 11 of the cutting units 9 and a ground surface 5, for example also when the cutting deck 1 is moved over an uneven ground surface 5. Still further, one or more of the guiding members 21 may bump into an object on the ground surface 5, such as a stone or stump, instead of one or more cutting units 9. As a result thereof, the operational reliability of the cutting deck 1 can be further improved.

According to some embodiments, the cutting deck 1 is arranged such that a kinetic energy of each cutting member 13 is below 90 Joules, or is below 2 Joules, during operation of the cutting deck 1. According to further embodiments, the cutting deck 1 is arranged such that a kinetic energy of each cutting member 13 is within the range of 0.1 Joules and 2 Joules. According to still further embodiments, the cutting deck 1 is arranged such that a kinetic energy of each cutting member 13 is within the range of 0.5 Joules and 70 joules, or is within the range of 5 Joules and 40 joules, or is within the range of 7 Joules and 25 joules.

Figure 4:
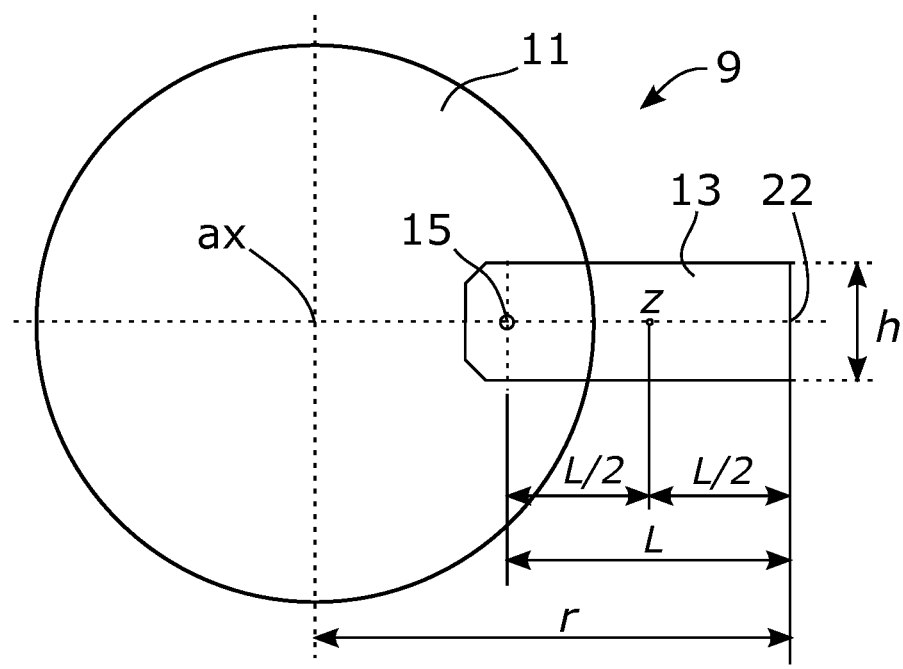

FIG. 4 schematically illustrates a rotor 11 and a cutting member 13 of a cutting unit 9 according to some embodiments. The kinetic energy of each cutting member 13 of a cutting unit 9 as described herein may be determined by means of the following formula:

$$Ek = \frac{1}{2} * m v^2$$

where

Ek is the kinetic energy, in Joules;

m is the mass, of reckonable length L of the cutting member 13, in kilograms, wherein the reckonable length L of the cutting member 13 may be the length L between the pivot axis 15 of the cutting member 13 and the radially outer portion 22 of a cutting member 13;

v is the maximum attainable velocity of the point z which is half way along the reckonable length L of the cutting member 13, in metres per second.

$$\text{Therefore } v = 0{,}1047 n \left[ r - \frac{L}{2} \right]$$

where n is the maximum rotational speed, in revolutions per minute;

r is the distance from the rotational axis ax of the cutting unit 9 to the radially outer portion 22 of a cutting member 13, in metres;

L is the reckonable length of the cutting member 13, in metres.

According to some embodiments of the cutting deck, the distance r from the rotational axis ax of the cutting unit 9 to the radially outer portion 22 of a cutting member 13 is within the range of 3 cm to 20 cm, or is within the range of 6 cm to 12 cm. According to the embodiments illustrated in FIG. 2, the distance r is approximately 8.5 cm.

According to some embodiments of the cutting deck, the reckonable length L of the cutting member 13 is within the range of 1 cm to 9 cm, or is within the range of 1.7 cm to 6 cm. According to the embodiments illustrated in FIG. 2, the reckonable length of the cutting member 13 is approximately 3.4 cm.

According to some embodiments of the cutting deck, the mass m, of reckonable length L of the cutting member 13, is within the range of 1 to 25 grams, or is within the range of 1.7 to 6.5 grams. According to the embodiments illustrated in FIG. 2, the mass m, of reckonable length L of the cutting member 13, is approximately 3.4 grams.

According to some embodiments, the thickness of the cutting member 13, i.e. the thickness of the cutting member 13 measured in a direction perpendicular to the rotational plane of the cutting member 13, is within the range of 0.2 mm to 3.5 mm, or is within the range of 0.32 mm to 1.2 mm. According to the embodiments illustrated in FIG. 2, the thickness of the cutting member 13 of the cutting deck, i.e. the thickness of the cutting member 13 measured in a direction perpendicular to the rotational plane of the cutting member 13, is approximately 0.63 mm.

According to some embodiments, the height h of the cutting member 13 of the cutting deck is within the range of 0.7 cm to 6 cm, or is within the range of 1 cm to 2.9 cm. According to the embodiments illustrated in FIG. 2, the height of the cutting member 13 is approximately 1.9 cm.

According to some embodiments of the cutting deck, the diameter of the rotors 11 of the cutting deck is within the range of 5 cm to 35 cm, or is within the range of 8 cm to 20 cm. According to the embodiments illustrated in FIG. 2, the diameter of the rotors 11 of the cutting deck is approximately 14.3 cm.

According to some embodiments, the maximum attainable velocity v of the point z which is half way along the reckonable length L of the cutting member 13 is within the range of 10 to 80 metres per second, or is within the range of 15 to 50 metres per second. According to the embodiments illustrated in FIG. 2, the maximum attainable velocity v of the point z which is half way along the reckonable length L of the cutting member 13 is approximately 34 metres per second.

According to some embodiments, the maximum rotational speed of the cutting unit 9 is within the range of 1 000 to 8 500 revolutions per minute, or is within the range of 2 400 to 7 200 revolutions per minute. According to the embodiments illustrated in FIG. 2, the maximum rotational speed of the cutting unit 9 is approximately 4 800 revolutions per minute.

In the following, reference is made to FIG. 1. As mentioned above, the cutting deck 1 comprises a second cutter shaft 7.2 arranged behind the first cutter shaft 7.1 seen in the forward direction d1. The second cutter shaft 7.2 is configured to rotate around a second rotational axis ax2. When the cutting deck 1 is positioned onto a ground surface 5, the second rotational axis ax2 extends substantially parallel to the ground surface 5. The feature that the second rotational axis ax2 extends substantially parallel to the ground surface 5 may encompass that an angle between the second rotational axis ax2 and the ground surface 5 is less than 5 degrees. The cutting units 9 of the second cutter shaft 7.2 are arranged on the second cutter shaft 7.2. When the second cutter shaft 7.2 is rotating around the second rotational axis ax2, each cutting unit 9 of the second cutter shaft 7.2 is rotating in a respective second rotational plane p2. For the reason of brevity, one such second rotational plane p2 is indicated with the reference sign "p2" in FIG. 1. The cutting units 9 of the second cutter shaft 7.2 are arranged at an axial distance d from each other along the second cutter shaft 7.2. Since the cutting units 9 are arranged on the second rotational axis ax2 and since the second cutter shaft 7.2 is arranged to rotate around the second rotational axis ax2 being substantially parallel to the ground surface 5, each second rotational plane p2 is substantially perpendicular to the ground surface 5. Further, as can be seen in FIG. 1, the second rotational plane p2 is angled in relation to the forward direction d1. Due to these features, a cutting deck 1 is provided capable of cutting grass in an efficient manner requiring a low amount of energy.

The second rotational plane p2 is angled in relation to the forward direction d1 at a second angle a2. According to the illustrated embodiments, the second angle a2 is approximately 30 degrees. According to further embodiments, the second angle a2 may be within the range of 5 degrees to 85 degrees, or within the range of 10 degrees to 60 degrees, or within the range of 20 degrees to 40 degrees.

As can be seen in FIG. 1, the second angle a2 is different from the first angle a1. According to the illustrated embodiments, the first and second angles a1, a2 have approximately the same size, namely about 30 degrees, but the second angle a2 is measured at an opposite side of a vector d1 indicating the forward direction d1, than the first angle a1. Thus, according to the illustrated embodiments, the first rotational planes p1 are angled counter clockwise in relation to the forward direction d1 seen in a direction towards the ground surface 5, and second rotational planes p2 are angled clockwise in relation to the forward direction d1 seen in a direction towards the ground surface 5. Accordingly, in the illustrated embodiments, the angle between a first rotational plane p1 and a second rotational plane p2 is approximately 60 degrees.

According to the illustrated embodiments, each of the first and second cutter shafts 7.1, 7.2 comprises eight cutting units 9. According to further embodiments, the number of cutting units 9 arranged on a cutter shaft 7.1, 7.2, 7.3, 7.4 of the cutting deck 1 may be within the range of three to twenty, or within the range of four to twelve.

Figure 5:
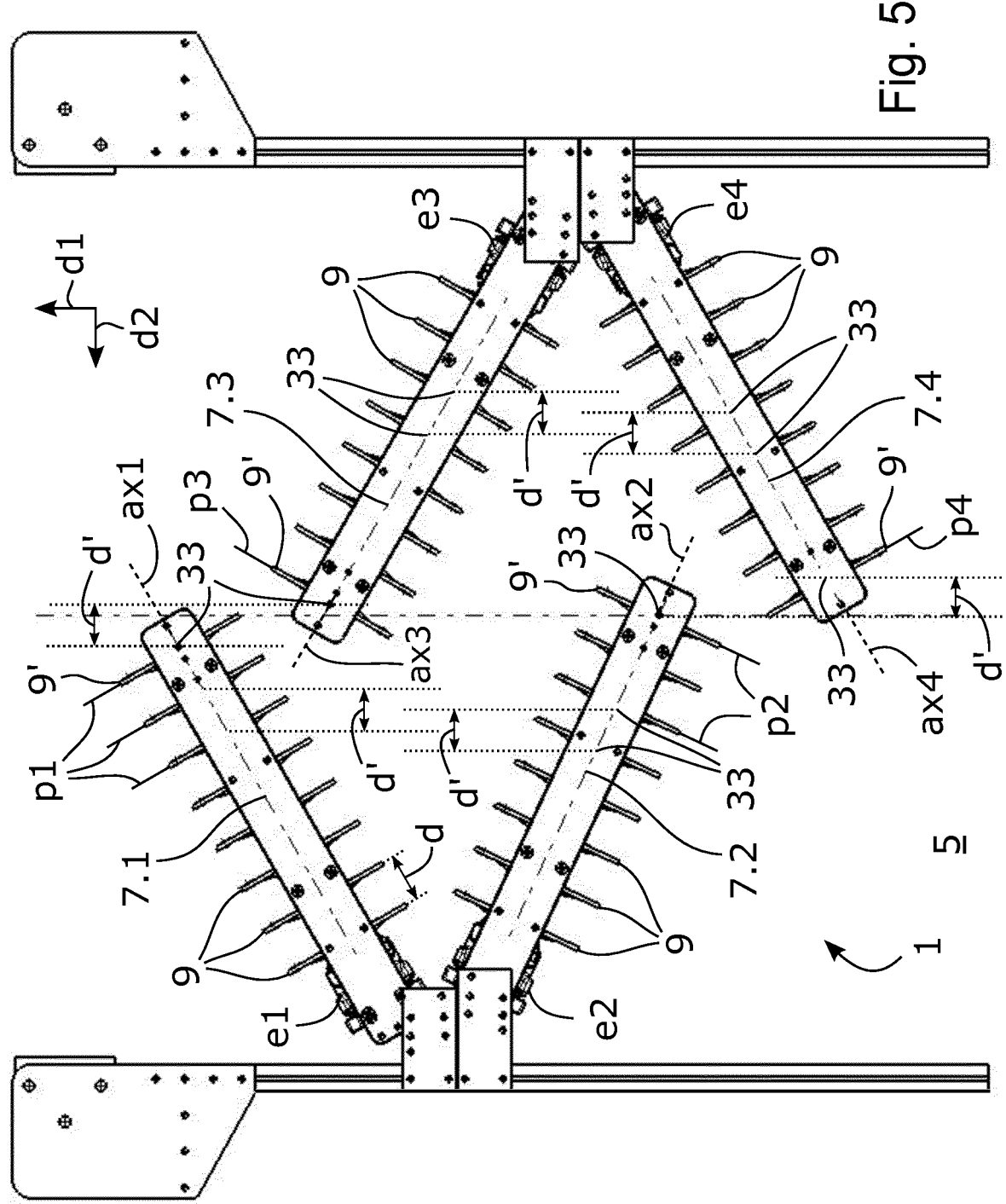
FIG. 5 illustrates the lawnmower cutting deck illustrated in FIG. 1.

FIG. 5 illustrates the lawnmower cutting deck 1 illustrated in FIG. 1. As indicated in FIG. 5, cutting units 9 of the second cutter shaft 7.2 are displaced in a direction d2 perpendicular to the forward direction d1 in relation to cutting units 9 of the first cutter shaft 7.1 approximately half the distance d' between cutting units 9 of the first cutter shaft 7.1 measured in the direction d2 perpendicular to the forward direction d1. That is, points 33 in which the second rotational axis ax2 intersects second rotational planes p2 of cutting units 9 of the second cutter shaft 7.2 are displaced in the direction d2 approximately half the distance d' relative points 33 in which the first rotational axis ax1 intersects first rotational planes p1 of cutting units 9 of the first cutter shaft 7.1. Thereby, the cutting result and the efficiency of cutting is further improved, because cutting units 9 of the first and second cutter shafts 7.1, 7.2 together cover a great area when the cutting deck 1 is moved in the forward direction d1, and cutting units 9 of the second cutter shaft 7.2 may cut grass that has not been cut by cutting units of the first cutter shaft 7.1. The distance d' may herein also be defined as the distance d' between rotational planes p1, p2 of cutting units 9 measured in the direction d2 perpendicular to the forward direction d1. Correspondingly, the axial distance d, as referred to herein may be defined as the distance d between rotational planes p1, p2 of cutting units 9 measured along the rotational axis ax1, ax2 of the cutter shaft 7.1, 7.2 of the cutting units 9. Further, the distance d' between cutting units 9 of the first cutter shaft 7.1 measured in the direction d2 perpendicular to the forward direction d1, may herein also be referred to as a projected distance d' between cutting units 9, or a projected distance d' between rotational planes p1 of cutting units 9, in the forward direction d1. According to the illustrated embodiments, the cutting units 9 are arranged at an axial distance d of 50 mm from each other along the respective cutter shaft 7.1, 7.2, 7.3, 7.4. Because the first rotational planes p1 are angled relation to the forward direction d1 at the first angle a1 being approximately 30 degrees, the distance d' between cutting units 9 of the first cutter shaft 7.1, measured in the direction d2 perpendicular to the forward direction d1, is according to the illustrated embodiments approximately 43.3 mm, and half the distance d' between cutting units 9 of the first cutter shaft 7.1, measured in the direction d2 perpendicular to the forward direction d1, is approximately 21.65 mm.

According to further embodiments, the axial distance d between cutting units 9 along the respective cutter shaft 7.1, 7.2, 7.3, 7.4 may be within the range of 20 mm and 140 mm, or within the range of 30 mm and 80 mm.

In the following, simultaneous reference is made to FIG. 1 and FIG. 5. As mentioned, the cutting deck 1 according to the illustrated embodiments comprises a third and a fourth cutter shafts 7.3, 7.4. The cutting deck 1 comprises a longitudinal centre line 30, which is indicated in FIG. 1. The first and second cutter shafts 7.1, 7.2 are arranged on a first lateral side of the longitudinal centre line 30, and the third and fourth cutter shafts 7.3, 7.4 are arranged on a second lateral side of the longitudinal centre line 30. The second lateral side is opposite to the first lateral side. According to the illustrated embodiments, the third and fourth cutter shafts 7.3, 7.4 are mounted as a longitudinal translated mirror image of the first and second cutter shafts 7.1, 7.2. The third cutter shaft 7.3 is laterally displaced relative the first cutter shaft 7.1 seen in the forward direction d1. The fourth cutter shaft 7.4 is laterally displaced relative the second cutter shaft 7.2 seen in the forward direction d1.

The first and second cutter shafts 7.1, 7.2 together forms a first V-formation. The third and fourth cutter shafts 7.3, 7.4 together forms a second V-formation, which extends into the first V-formation. Furthermore, the second V-formation is displaced a distance in a direction opposite to the forward direction d1 relative the first V-formation. Rotational axes ax1, ax2, ax3, ax4 of the first, the second, the third, and the fourth cutter shafts 7.1, 7.2, 7.3, 7.4 together form a rhomboid. This formation and orientation of cutter shafts 7.1, 7.2, 7.3, 7.4 has proven to provide a good cutting result and a low consumption of energy during operation. However, other formations and orientations of cutter shafts 7.1, 7.2, 7.3, 7.4 are plausible, and the formations and orientations of cutter shafts 7.1, 7.2, 7.3, 7.4 are limited only be the definitions of the appended claims. Purely as examples, the cutting deck 1 may comprise only the first cutter shaft 7.1, the cutting deck 1 may comprise only the first and second cutter shafts 7.1, 7.2, the cutting deck 1 may comprise only the first and third cutter shafts 7.1, 7.3, or the cutting deck 1 may comprise only the second and fourth cutter shafts 7.2, 7.4.

In more detail, the third cutter shaft 7.3 is configured to rotate around a third rotational axis ax3. When the cutting deck 1 is positioned onto a ground surface 5, the third rotational axis ax3 extends substantially parallel to the ground surface 5. The feature that the third rotational axis ax3 extends substantially parallel to the ground surface 5 may encompass that an angle between the third rotational axis ax3 and the ground surface 5 is less than 5 degrees. The cutting units 9 of the third cutter shaft 7.3 are arranged on the third cutter shaft 7.3. When the third cutter shaft 7.3 is rotating around the third rotational axis ax3, each cutting unit 9 of the third cutter shaft 7.3 is rotating in a respective third rotational plane p3. For the reason of brevity, one such third rotational plane p3 is indicated with the reference sign "p3" in FIG. 1. The cutting units 9 of the third cutter shaft 7.3 are arranged at an axial distance d from each other along the third cutter shaft 7.3. Since the cutting units 9 are arranged on the third rotational axis ax3 and since the third cutter shaft 7.3 is arranged to rotate around the third rotational axis ax3 being substantially parallel to the ground surface 5, each third rotational plane p3 is substantially perpendicular to the ground surface 5. Further, as can be seen in FIG. 1, the third rotational plane p3 is angled in relation to the forward direction d1. Due to these features, a cutting deck 1 is provided capable of cutting grass in an efficient manner requiring a low amount of energy.

The third rotational plane p3 is angled in relation to the forward direction d1 at a third angle a3. According to the illustrated embodiments, the third angle a3 is approximately 30 degrees. According to further embodiments, the third angle a3 may be within the range of 5 degrees to 85 degrees, or within the range of 10 degrees to 60 degrees, or within the range of 20 degrees to 40 degrees.

As can be seen in FIG. 1, the third angle a3 is different from the first angle a1. According to the illustrated embodiments, the first and third angles a1, a3 have approximately the same size, namely about 30 degrees, but the third angle a3 is measured at an opposite side of a vector d1 indicating the forward direction d1, than the first angle a1. According to the illustrated embodiments, the first rotational planes p1 are angled counter clockwise in relation to the forward direction d1 seen in the direction towards the ground surface 5, and third rotational planes p3 are angled clockwise in relation to the forward direction d1 seen in a direction towards the ground surface 5. Thus, according to the illustrated embodiments, an angle between a first rotational plane p1 and a third rotational plane p3 is approximately 60 degrees. Further, as can be seen in FIG. 1, the third rotational plane p3 is substantially parallel to the second rotational plane p2.

According to the illustrated embodiments, each of the first and third cutter shafts 7.1, 7.3 comprises eight cutting units 9. According to further embodiments, the number of cutting units 9 arranged on a cutter shaft 7.1, 7.2, 7.3, 7.4 of the cutting deck 1 may be within the range of three to twenty, or within the range of four to twelve.

According to the illustrated embodiments, and as indicated in FIG. 5, a distance d' between a point 33 in which the third rotational axis ax3 intersects a third rotational plane p3 of a cutting unit 9' of the third cutter shaft 7.3 and a point 33 in which the first rotational axis ax1 intersects a first rotational plane p1 of a cutting unit 9' of the first cutter shaft 7.1, measured in a direction d2 perpendicular to the forward direction d1, substantially corresponds to a distance d' between first rotational planes p1 of cutting units 9 of the first cutter shaft 7.1 measured in the direction d2 perpendicular to the forward direction d1. Further, according to the illustrated embodiments, the distance d' between a point 33 in which the third rotational axis ax3 intersects a third rotational plane p3 of a cutting unit 9' of the third cutter shaft 7.3 and a point 33 in which the first rotational axis ax1 intersects a first rotational plane p1 of a cutting unit 9' of the first cutter shaft 7.1, measured in a direction d2 perpendicular to the forward direction d1, substantially corresponds to a distance d' between third rotational planes p3 of cutting units 9 of the third cutter shaft 7.3 measured in the direction d2 perpendicular to the forward direction d1. Thus, according to the illustrated embodiments, cutting units 9 of the first cutter shaft 7.1 and cutting units 9 of the third cutter shaft 7.3 are arranged at positions of the respective cutter shaft 7.1, 7.3 resulting in substantially equal distances d' between points 33 in which rotational planes p1, p3 of the cutting units 9 intersect the respective rotational axis ax1, ax3 along the direction d2 perpendicular to the forward direction d1. As a result thereof, the cutting result is further improved, because during movement of the cutting deck 1 in the forward direction d1, the cutting units 9 may cut a respective portion of a lawn, wherein the portions are substantially equally spaced along the direction d2 perpendicular to the forward direction d1.

According to the illustrated embodiments, the fourth cutter shaft 7.4 is arranged behind the third cutter shaft 7.3 seen in the forward direction d1. The fourth cutter shaft 7.4 is configured to rotate around a fourth rotational axis ax4. When the cutting deck 1 is positioned onto a ground surface 5, the fourth rotational axis ax4 extends substantially parallel to the ground surface 5. The feature that the fourth rotational axis ax4 extends substantially parallel to the ground surface 5 may encompass that an angle between the fourth rotational axis ax4 and the ground surface 5 is less than 5 degrees. The cutting units 9 of the fourth cutter shaft 7.4 are arranged on the fourth cutter shaft 7.4. When the fourth cutter shaft 7.4 is rotating around the fourth rotational axis ax4, each cutting unit 9 of the fourth cutter shaft 7.4 is rotating in a respective fourth rotational plane p4. For the reason of brevity, one such fourth rotational plane p4 is indicated with the reference sign "p4" in FIG. 1. The cutting units 9 of the fourth cutter shaft 7.4 are arranged at an axial distance d from each other along the fourth cutter shaft 7.4. Since the cutting units 9 are arranged on the fourth rotational axis ax4 and since the fourth cutter shaft 7.4 is arranged to rotate around the fourth rotational axis ax4 being substantially parallel to the ground surface 5, each fourth rotational plane p4 is substantially perpendicular to the ground surface 5. Further, as can be seen in FIG. 1, the fourth rotational plane p4 is angled in relation to the forward direction d1. Due to these features, a cutting deck 1 is provided capable of cutting grass in an efficient manner requiring a low amount of energy.

The fourth rotational plane p4 is angled in relation to the forward direction d1 at a fourth angle a4. According to the illustrated embodiments, the fourth angle a4 is approximately 30 degrees. According to further embodiments, the fourth angle a4 may be within the range of 5 degrees to 85 degrees, or within the range of 10 degrees to 60 degrees, or within the range of 20 degrees to 40 degrees.

As can be seen in FIG. 1, the fourth angle a4 is different from the third angle a3. According to the illustrated embodiments, the third and fourth angles a3, a4 have approximately the same size, namely about 30 degrees, but the fourth angle a4 is measured at an opposite side of a vector d1 indicating the forward direction d1, than the third angle a3. According to the illustrated embodiments, the fourth rotational planes p4 are angled counter clockwise in relation to the forward direction d1 seen in the direction towards the ground surface 5, and the third rotational planes p3 are angled clockwise in relation to the forward direction d1 seen in a direction towards the ground surface 5. Thus, according to the illustrated embodiments, an angle between a third rotational plane p3 and a fourth rotational plane p4 is approximately 60 degrees. Further, as can be seen in FIG. 1, the fourth rotational plane p4 is substantially parallel to the first rotational plane p1.

Further, as is indicated in FIG. 5, cutting units 9 of the fourth cutter shaft 7.4 are displaced in a direction d2 perpendicular to the forward direction d1 in relation to cutting units 9 of the third cutter shaft 7.3 approximately half the distance d' between cutting units 9 of the third cutter shaft 7.3 measured in the direction d2 perpendicular to the forward direction d1. That is, points 33 in which the fourth rotational axis ax4 intersects fourth rotational planes p4 of cutting units 9 of the fourth cutter shaft 7.4 are displaced in the direction d2 approximately half the distance d' relative points 33 in which the third rotational axis ax3 intersects third rotational planes p3 of cutting units 9 of the third cutter shaft 7.3. Thereby, the cutting result and the efficiency of cutting is further improved, because cutting units 9 of the third and fourth cutter shafts 7.3, 7.4 together cover a great area when the cutting deck 1 is moved in the forward direction d1, and cutting units 9 of the fourth cutter shaft 7.4 may cut grass that has not been cut by cutting units of the third cutter shaft 7.3. The distance d' may also be defined as the distance d' between rotational planes p3, p4 of cutting units 9 measured in the direction d2 perpendicular to the forward direction d1. Correspondingly, the axial distance d, as referred to herein may be defined as the distance d between rotational planes p3, p4 of cutting units 9 measured along the rotational axis ax3, ax4 of the cutter shaft 7.3, 7.4 of the cutting units 9. According to the illustrated embodiments, the cutting units 9 are arranged at an axial distance d of 50 mm from each other along the respective cutter shaft 7.1, 7.2, 7.3, 7.4. Because the third rotational planes p3 are angled relation to the forward direction d1 at the third angle a3 being approximately 30 degrees, the distance d' between cutting units 9 of the third cutter shaft 7.3, measured in the direction d2 perpendicular to the forward direction d1, is approximately 43.3 mm, and half the distance d' between cutting units 9 of the third cutter shaft 7.3, measured in the direction d2 perpendicular to the forward direction d1, is approximately 21.65 mm.

According to the illustrated embodiments, and as indicated in FIG. 5, a distance d' between a point 33 in which the fourth rotational axis ax4 intersects a fourth rotational plane p4 of a cutting unit 9' of the fourth cutter shaft 7.4 and a point 33 in which the second rotational axis ax2 intersects a second rotational plane p2 of a cutting unit 9' of the second cutter shaft 7.2 measured in a direction d2 perpendicular to the forward direction d1, substantially corresponds to a distance d' between second rotational planes p2 of cutting units 9 of the second cutter shaft 7.2 measured in the direction d2 perpendicular to the forward direction d1. Further, according to the illustrated embodiments, the distance d' between a point 33 in which the fourth rotational axis ax4 intersects a fourth rotational plane p4 of a cutting unit 9' of the fourth cutter shaft 7.4 and a point 33 in which the second rotational axis ax2 intersects a second rotational plane p2 of a cutting unit 9' of the second cutter shaft 7.2, measured in a direction d2 perpendicular to the forward direction d1, substantially corresponds to a distance d' between fourth rotational planes p4 of cutting units 9 of the fourth cutter shaft 7.4 measured in the direction d2 perpendicular to the forward direction d1. Thus, according to the illustrated embodiments, cutting units 9 of the second cutter shaft 7.2 and cutting units 9 of the fourth cutter shaft 7.4 are arranged at positions of the respective cutter shaft 7.2, 7.4 resulting in substantially equal distances d' between points 33 in which rotational planes p1, p4 of the cutting units 9 intersect the respective rotational axis ax2, ax4 along the direction d2 perpendicular to the forward direction d1. As a result thereof, the cutting result is further improved, because during movement of the cutting deck 1 in the forward direction d1, the cutting units 9 of the second and fourth cutter shafts 7.2, 7.4 may cut a respective portion of a lawn, wherein the portions are substantially equally spaced along the direction d2 perpendicular to the forward direction d1.

According to the illustrated embodiments, and as is indicated in FIG. 5, the cutting deck 1 comprises a first electric motor e1 configured to rotate the first cutter shaft 7.1, a second electric motor e2 configured to rotate the second cutter shaft 7.2, a third electric motor e3 configured to rotate the third cutter shaft 7.3, and a fourth electric motor e4 configured to rotate the fourth cutter shaft 7.4. The electric motors e1, e2, e3, e4 may be configured to rotate the cutter shafts 7.1, 7.2, 7.3, 7.4 directly, or via a transmission. According to further embodiments, the cutting deck 1, or a lawnmower comprising the cutting deck 1, may comprise one electric motor configured to rotate one or more cutter shafts 7.1, 7.2, 7.3, 7.4 of the cutting deck 1. The electric motors e1, e2, e3, e4 may be configured to rotate the cutter shafts 7.1, 7.2, 7.3, 7.4 in rotational directions causing portions the cutting units 9 below their respective rotational axis ax1, ax2, ax3, ax4 to move in tangential directions having components in the forward direction d1. Further, the electric motors e1, e2, e3, e4 may be configured to rotate the cutter shafts 7.1, 7.2, 7.3, 7.4 in rotational speeds ensuring that a kinetic energy of each cutting member 13 is below a predetermined threshold value and/or is within a predetermined range, wherein such a predetermined threshold value and/or an endpoint of such a predetermined range may be a value according to any of the examples given herein, such as 2 Joules, or 70 Joules. Further, the electric motors e1, e2, e3, e4 may be configured to rotate the cutter shafts 7.1, 7.2, 7.3, 7.4 in rotational speeds ensuring that a maximum attainable velocity of a point which is half way along the reckonable length of each cutting member 13 is below a predetermined threshold value, and/or ensuring that a rotational speed of each cutter shaft 7.1, 7.2, 7.3, 7.4 is below a predetermined threshold value.

As is evident from FIG. 1 and FIG. 5, and from the above, according to the illustrated embodiments, cutting units 9 of a cutter shaft 7.1, 7.2, 7.3, 7.4 are configured to cut in axially spaced, mutually parallel, planes p1, p2, p3, p4.

Figure 6:
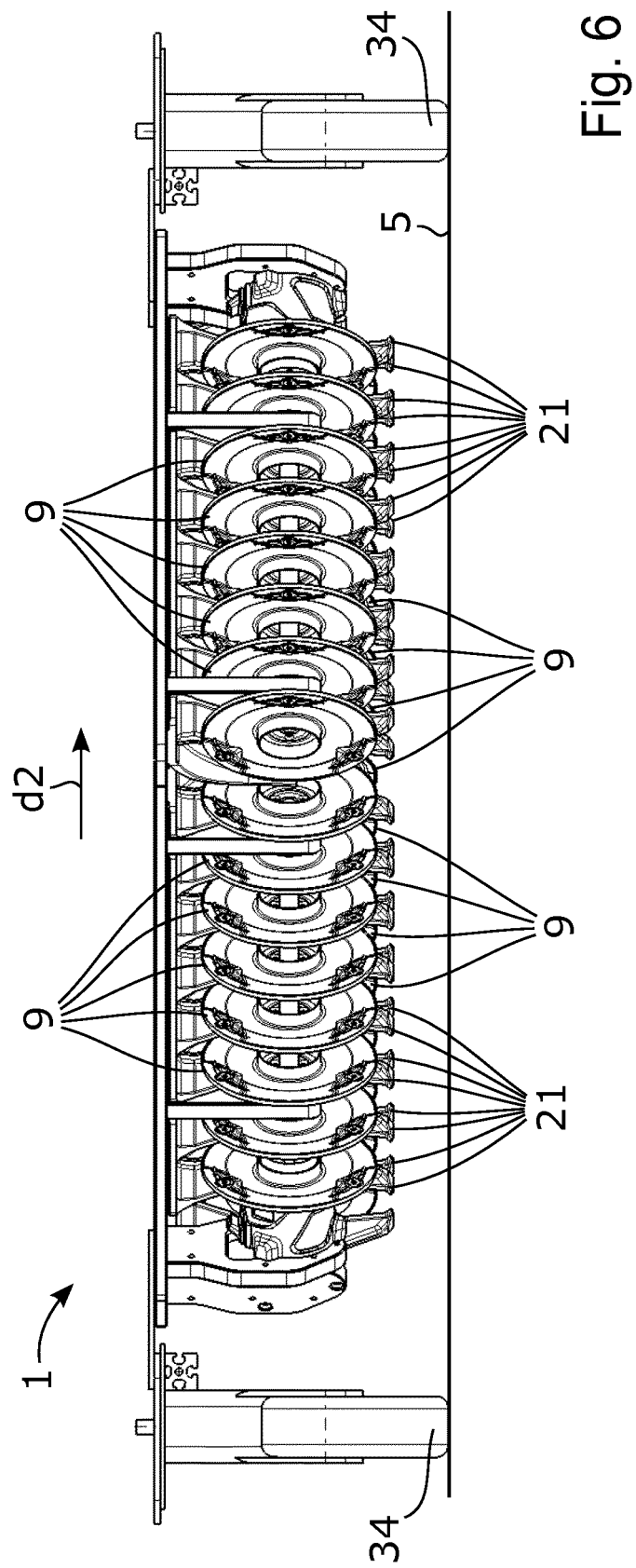
FIG. 6 illustrates a front view of the cutting deck, illustrated in FIG. 1, FIG. 2 and FIG. 5.

FIG. 6 illustrates a front view of the cutting deck 1, illustrated in FIG. 1, FIG. 2 and FIG. 5. In FIG. 6, the cutting deck 1 is illustrated as being viewed in a direction opposite to the forward direction. According to the illustrated embodiments, the cutting deck 1 comprises wheels 34 configured to support the cutting deck 1 at an adjustable height over a ground surface 5. According to the illustrated embodiments, the cutting deck 1 comprises a guiding member 21 arranged between each adjacent pair of cutting units 9. Thereby, a further efficient cutting is provided, because the guiding members 21 will guide grass towards rotational planes of the cutting members 9. In addition, the guiding members 21 may ensure that a distance is obtained between rotors of the cutting units 9 and a ground surface 5, also when the cutting deck 1 is moved over an uneven ground surface 5. Still further, one or more of the guiding members 21 may bump into an object on the ground surface 5, such as a stone or stump, instead of one or more cutting units 9. As a result thereof, the operational reliability of the cutting deck 1 is further improved. For the reason of brevity and clarity, In FIG. 6, only some of the cutting units 9 are indicated with the reference sign "9" and only some of the guiding members 21 are indicated with the reference sign "21".

Further, as is evident from FIG. 6, the cutting units 9 of the cutting deck 1 are substantially equally spaced in the direction d2 opposite to the forward direction. As a result thereof, the cutting result is further improved, because during movement of the cutting deck 1 in the forward direction, the cutting units 9 may cut a respective portion of a lawn, wherein the portions are substantially equally spaced along the direction d2 perpendicular to the forward direction.

Figure 7:
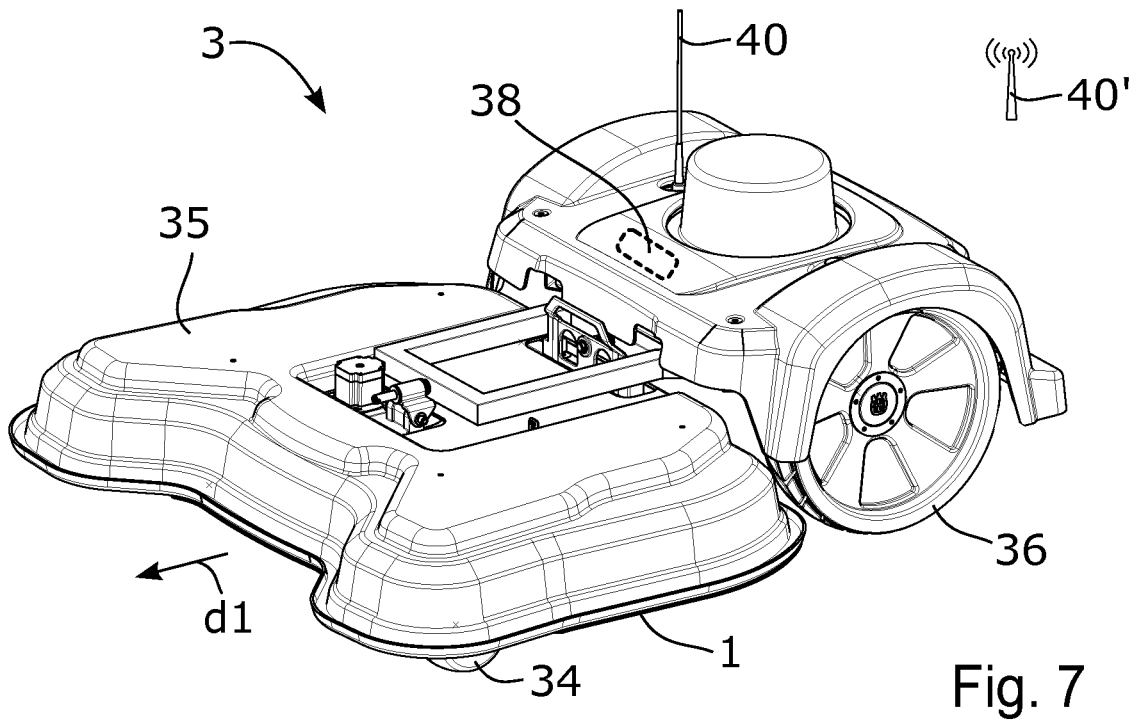
FIG. 7 illustrates a lawnmower according to some embodiments.

FIG. 7 illustrates a lawnmower 3 according to some embodiments. The lawnmower 3 comprises a lawnmower cutting deck 1 according to the embodiments illustrated in FIG. 1, FIG. 2, FIG. 5, and FIG. 6. In FIG. 7, one wheel 34 of the wheels 34 of the cutting deck 1 is visible. The wheels 34 constitutes front wheels of the lawnmower 3 according to the illustrated embodiments. The lawnmower 3 further comprises rear wheels 36 each powered by an electric motor. The cutting deck 1 of the lawnmower 3 comprises a housing 35 covering upper portions of all cutting units of the cutting deck 1.

According to the embodiments illustrated in FIG. 7, the lawnmower 3 is a self-propelled robotic lawnmower 3 capable of mowing a lawn in an autonomous manner without the intervention of a user. The lawnmower 3 may comprise one or more batteries arranged to supply electricity to electric motors of the lawnmower 3. According to the illustrated embodiments, the lawnmower 3 comprises a control unit 38. The lawnmower 1 may further comprise one or more sensors connected to the control unit 38, wherein the one or more sensors may be arranged to sense a magnetic field of a wire, and/or an impending or ongoing collision event with an object. The lawnmower 1 may comprise one or more positioning units configured to estimate a current position of the lawnmower 3. According to the illustrated embodiments, the lawnmower 1 comprises a communication unit 40 connected to the control unit 38. The communication unit 40 is configured to communicate with a remote communication unit 40' to receive instructions therefrom and/or to send information thereto. The communication may be performed wirelessly over a wireless connection such as the internet, or a wireless local area network (WLAN), or a wireless connection for exchanging data over short distances using short-wavelength, i.e. ultra-high frequency (UHF) radio waves in the industrial, scientific and medical (ISM) band from 2.4 to 2.485 GHz.

The control unit 38 may be configured to navigate the lawnmower 1 in a systematic and/or random pattern to mow an area. The control unit 38 may navigate the lawnmower 3 using input from the one or more sensors, the one or more positioning units, and/or communication unit 40. The control unit 38 may navigate the lawnmower 3 by controlling rotational speed of wheels 36 of the lawnmower 3. The lawnmower 3 may be configured to mow lawns, gardens, parks, sports fields, golf courts and the like. The control unit 38 may be configured to navigate the lawnmower 3 in a manner such that the cutting deck 1 mainly is moved in the forward direction d1, indicated in FIG. 7.

According to the embodiments illustrated in FIG. 7, the self-propelled robotic lawnmower 3 may be arranged such that a kinetic energy of each cutting member of the cutting deck 1, during operation of the robotic lawnmower 3, is below 2 Joules, for example such that a kinetic energy of each cutting member of the cutting deck 1 is within the range of 0.1 Joules and 2 Joules.

Figure 8:
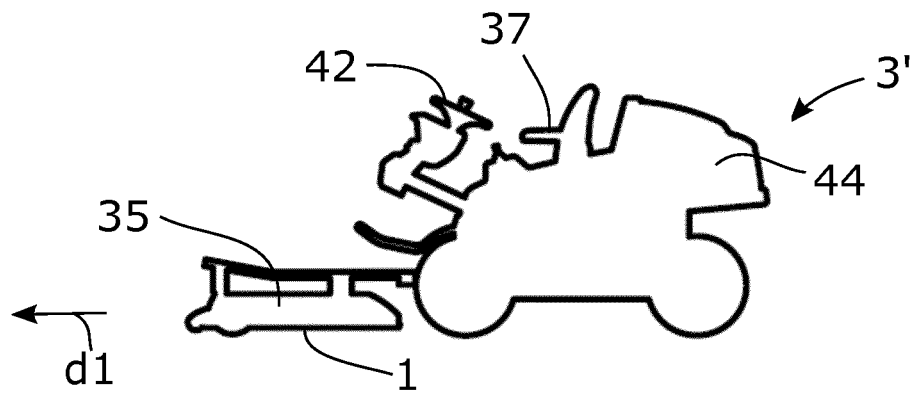
FIG. 8 illustrates a lawnmower according to some further embodiments.

FIG. 8 illustrates a lawnmower 3' according to some further embodiments. The lawnmower 3' comprises a lawnmower cutting deck 1 according to the embodiments illustrated in FIG. 1, FIG. 2, FIG. 5, and FIG. 6. According to the illustrated embodiments, the lawnmower 3' is a riding mower 3' comprising a seat 37 for an operator. Further the lawnmower 3' comprises a steering device 42, such as a steering wheel, and a motor 44 configured to provide motive power to the lawnmower 3'. The motor 44 may comprise a combustion engine and/or an electric motor. Also in these embodiments, the cutting deck 1 of the lawnmower 3' comprises a housing 35 covering upper portions of all cutting units of the cutting deck 1. The lawnmower 3' may be configured to mow lawns, gardens, parks, sports fields, golf courts and the like. The forward direction d1 of the cutting deck 1 is indicated with the arrow "d1".

According to the embodiments illustrated in FIG. 8, the riding mower 3' may be arranged such that a kinetic energy of each cutting member of the cutting deck 1, during operation of the riding mower 3', is below 90 Joules, for example such that a kinetic energy of each cutting member of the cutting deck 1 is within the range of 0.1 Joules and 70 Joules, or is within the range of 1 Joules and 40 Joules, or is within the range of 0.1 Joules and 2 Joules.

Figure 9:
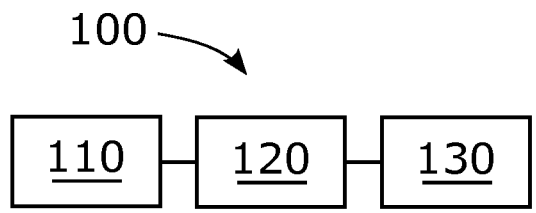
FIG. 9 illustrates a method of mowing a lawn.

FIG. 9 illustrates a method 100 of mowing a lawn. Steps of the method 100 may be performed using a cutting deck 1 according to the embodiments illustrated in FIG. 1, FIG. 2, FIG. 5, and FIG. 6. Therefore, below, simultaneous reference is made to FIG. 1, FIG. 2, FIG. 5, FIG. 6, and FIG. 9. The method 100 comprises the steps of:
- providing 110 a lawnmower cutting deck 1 comprising a first cutter shaft 7.1 and at least one cutting unit 9 arranged on the first cutter shaft 7.1,
- moving 120 the lawnmower cutting deck 1 in a forward direction d1 over a ground surface 5, and
- rotating 130 the first cutter shaft 7.1 around a first rotational axis ax1 extending substantially parallel to the ground surface 5 to rotate the at least one cutting unit 9 in a first rotational plane p1, wherein the first rotational plane p1 is angled in relation to the forward direction d1.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A lawnmower cutting deck, wherein the cutting deck is configured to be moved in a forward direction over a ground surface to cut grass, the cutting deck comprising:
   a first cutter shaft;
   a first cutting unit arranged on the first cutter shaft;

a second cutter shaft; and
a second cutting unit arranged on the second cutter shaft;
wherein the first cutter shaft is configured to rotate around a first rotational axis extending substantially parallel to the ground surface to rotate the first cutting unit in a first rotational plane;
wherein the first rotational plane is angled in relation to the forward direction at a first angle;
wherein the second cutter shaft is configured to rotate around a second rotational axis extending substantially parallel to the ground surface to rotate the second cutting unit in a second rotational plane;
wherein the second rotational plane is angled in relation to the forward direction at a second angle;
wherein the first cutting unit comprises a rotor and a cutting member arranged on the rotor at a distance from the first rotational axis;
wherein the cutting member is pivotably arranged on the rotor;
wherein the second angle is opposite the first angle; and
wherein the first and second cutter shafts both lie in a same horizontal plane.

2. The cutting deck according to claim 1, wherein the cutting member is pivotably arranged about a pivot axis, and wherein the pivot axis is substantially perpendicular to the first rotational plane.

3. The cutting deck according to claim 1, wherein the cutting deck comprises a plurality of first cutting units comprising the first cutting unit, wherein the plurality of first cutting units are arranged at an axial distance from each other along the first cutter shaft.

4. The cutting deck according to claim 1,
wherein the second cutter shaft is positioned behind the first cutter shaft with respect to the forward direction;
wherein the first cutter shaft and the second cutter shaft are disposed within a common plane that is substantially parallel to the ground surface; and
wherein the first cutter shaft and the second cutter shaft extend from a common side of the cutting deck, the first cutter shaft extending to form an acute angle with the common side and the second cutter shaft extending to form an obtuse angle with the common side.

5. The cutting deck according to claim 3, wherein the second cutting unit is displaced in a direction perpendicular to the forward direction in relation to two of the cutting units of the plurality of first cutting units approximately halfway between the two of the cutting units of the plurality of first cutting units measured in the direction perpendicular to the forward direction.

6. The cutting deck according to claim 4, wherein the third rotational plane is substantially parallel to the second rotational plane and the second angle is substantially equal to the third angle.

7. The cutting deck according to claim 1, wherein the cutting deck comprises a third cutter shaft and a third cutting unit arranged on the third cutter shaft, wherein the third cutter shaft is configured to rotate around a third rotational axis extending substantially parallel to the ground surface to rotate the third cutting unit in a third rotational plane, and wherein the third rotational plane is angled in relation to the forward direction at a third angle;
wherein the second angle is different from the first angle and the third angle is different from the first angle.

8. The cutting deck according to claim 7, wherein the third rotational plane is angled in relation to the forward direction at the third angle, and wherein the third angle is within the range of 5 degrees to 85 degrees.

9. The cutting deck according to claim 7, wherein one of the first and third rotational planes is angled clockwise in relation to the forward direction with respect to a direction towards the ground surface, and the other of the first and third rotational planes is angled counter clockwise in relation to the forward direction with respect to the direction towards the ground surface.

10. The cutting deck according to claim 7, wherein the third cutter shaft is laterally displaced relative the first cutter shaft with respect to the forward direction.

11. The cutting deck according to claim 7, wherein the cutting deck comprises:
a first plurality of cutting units comprising the first cutting unit, the first plurality of cutting units being arranged on the first cutter shaft;
wherein a distance between a point in which the third rotational axis intersects the third rotational plane of the third cutting unit of the third cutter shaft and a point in which the first rotational axis intersects the first rotational plane of the first cutting unit of the first cutter shaft measured in a direction perpendicular to the forward direction, substantially corresponds to a distance between first rotational planes of each of the cutting units of the plurality of first cutting units measured in the direction perpendicular to the forward direction.

12. The cutting deck according to claim 7, wherein the cutting deck comprises a fourth cutter shaft and a fourth cutting unit arranged on the fourth cutter shaft, wherein the fourth cutter shaft is configured to rotate around a fourth rotational axis extending substantially parallel to the ground surface to rotate the fourth cutting unit in a fourth rotational plane, and wherein the fourth rotational plane is angled in relation to the forward direction at a fourth angle;
the third angle is different from the first angle and the second angle is different from the fourth angle.

13. The cutting deck according to claim 12, wherein the fourth rotational plane is angled in relation to the forward direction at the fourth angle, and wherein the fourth angle is within the range of 5 degrees to 85 degrees.

14. The cutting deck according to claim 13, wherein the fourth angle is different from the third angle.

15. The cutting deck according to claim 12, wherein the fourth cutter shaft is arranged behind the third cutter shaft with respect to the forward direction.

16. The cutting deck according to claim 15, wherein the fourth rotational plane is substantially parallel to the first rotational plane, and the fourth angle is substantially equal to the first angle.

17. The cutting deck according to claim 16, wherein the cutting deck comprises a third plurality of cutting units comprising the third cutting unit arranged on the third cutter shaft and a fourth plurality of cutting units comprising the fourth cutting unit arranged on the fourth cutter shaft.

18. The cutting deck according to claim 17, wherein the fourth cutting unit is displaced in a direction perpendicular to the forward direction in relation to two of the cutting units of the plurality of third cutting units approximately halfway between the two of the cutting units of the plurality of third cutting units measured in the direction perpendicular to the forward direction.

19. The cutting deck according to claim 18, wherein the cutting deck comprises:
a second plurality of cutting units comprising the second cutting unit, the second plurality of cutting units arranged on the second cutter shaft;

wherein a distance between a point in which the fourth rotational axis intersects the fourth rotational plane of the fourth cutting unit of the fourth cutter shaft and a point in which the second rotational axis intersects the second rotational plane of the second cutting unit of the second cutter shaft measured in a direction perpendicular to the forward direction, substantially corresponds to a distance between the second rotational planes of each of the cutting units of the plurality of second cutting units measured in the direction perpendicular to the forward direction.

20. The cutting deck according to claim 12, wherein the first, the second, the third, and the fourth rotational axes together form a rhomboid.

21. The lawnmower cutting deck of claim 12, wherein the second cutter shaft is positioned behind the first cutter shaft with respect to the forward direction and the fourth cutter shaft is positioned behind the third cutter shaft with respect to the forward direction;
wherein the first cutter shaft, the second cutter shaft, the third cutter shaft, and the fourth cutter shaft extend towards a cutting center line of the cutting deck in a staggered configuration.

22. The lawnmower cutting deck of claim 1, further comprising a first wheel and a second wheel, the first wheel and the second wheel being affixed to the cutting deck at external positions such that the first cutter shaft and the second cutter shaft are positioned to cut grass that passes between the first wheel and the second wheel.

23. The cutting deck according to claim 1, wherein a first wheel and a second wheel support the cutting deck at an adjustable height over the ground surface and, when the height of the cutting deck over the ground surface is adjusted, the first rotational axis and the second rotational axis remain in fixed relative positions.

* * * * *